March 12, 1968   J. W. HOLLAND   3,373,244
CO-AXIAL CABLE AND METHOD OF MAKING IT
Filed Sept. 20, 1966
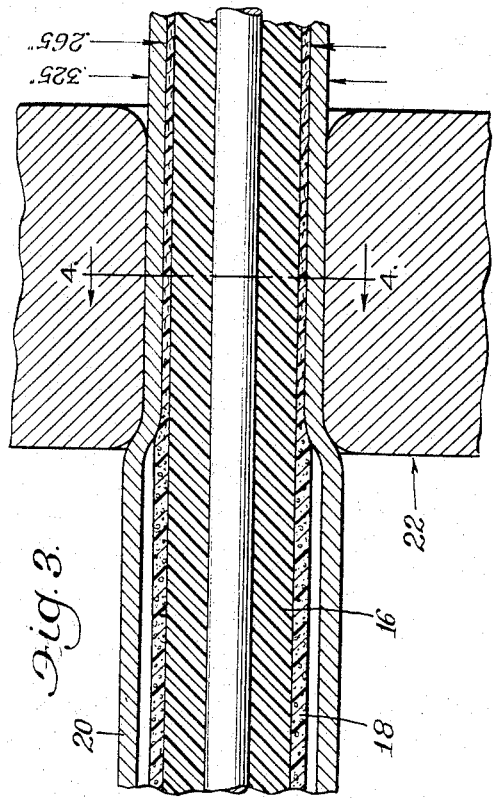
Fig. 3.
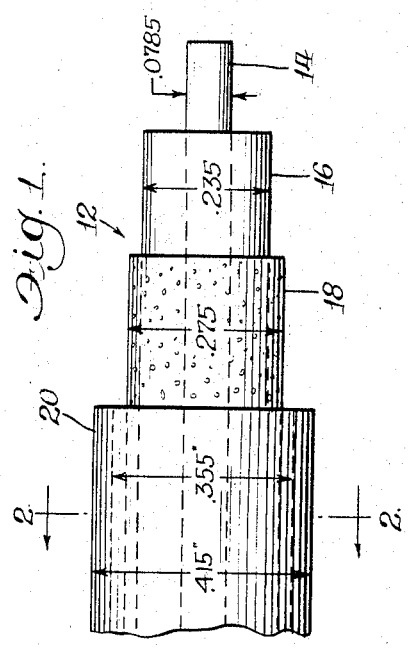
Fig. 1.
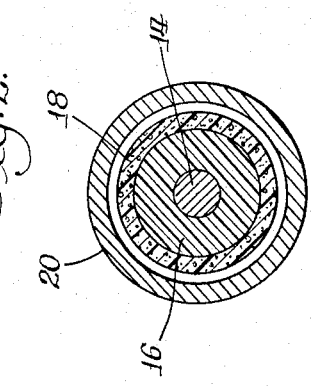
Fig. 4.
Fig. 2.
Inventor
John W. Holland
By L. F. Hammand
Atty.

United States Patent Office 3,373,244
Patented Mar. 12, 1968

3,373,244
CO-AXIAL CABLE AND METHOD OF MAKING IT
John W. Holland, La Grange, Ill., assignor to Amphenol Corporation, Broadview, Ill., a corporation of Delaware
Filed Sept. 20, 1966, Ser. No. 580,743
9 Claims. (Cl. 174—102)

ABSTRACT OF THE DISCLOSURE

Co-axial cable having dielectric material between the outer and inner conductors, the dielectric material is of two layers, an inner solid non-compressible layer and an outer cellular compressible layer, the outer conductor being reduced in diameter on the outer layer which is thereby compressed, maintaining accuracy of dimensions of the conductors.

---

The present invention relates to a co-axial cable and method of making it.

A broad object of the invention is to provide a co-axial cable of extremely high accuracy in physical construction and corresponding high precision in electrical characteristics.

The manufacture of co-axial cables involves certain difficulties in producing high accuracy between the inner and outer conductors, causing periodic variations resulting in severe reflections within the cable, this condition being most critical at the higher frequencies which involve relatively short wave lengths. Such a co-axial cable includes a central conductor, a layer or sheath of dielectric material surrounding the inner conductor, and an outer conductor in the form of a tube surrounding or encompassing the dielectric material. Irregularities and inaccuracies appear in the formation of the dielectric material, and these same inaccuracies are very often reflected in the outer conductor. In order to produce high precision relation, the spacing between the inner and outer conductors should be as nearly uniform as possible.

Another object therefore of the invention is to provide a construction of co-axial cable including a dielectric component between the inner and outer conductors which is capable of yielding to correct any irregularities that would otherwise occur as between the conductors.

Another and more specific object is to provide a construction of co-axial cable of the character just referred to in which the dielectric component between the conductors includes a segment of expanded dielectric material having voids or spaces therein and which is therefore compressible, whereby an outer tube, forming the outer conductor, may be applied to the dielectric material and reduced thereon, compressing the expanded dielectric material, whereby the outer tube can be reduced to the intended and desired highly precise dimensions.

Still another object is to provide a method of forming a co-axial cable according to the foregoing considerations.

Other objects and advantages of the invention will appear from the following detail description taken in conjunction with the accompanying drawings in which—

FIGURE 1 is a side elevational view of the co-axial cable of the invention, showing end portions of the various layers successively exposed;

FIGURE 2 is a sectional view taken at line 2—2 of FIGURE 1;

FIGURE 3 is an axial sectional view of the elements or components of the cable being drawn through a die to produce a finished cable; and FIGURE 4 is a sectional view taken at line 4—4 of FIGURE 3.

Referring now in detail to the accompanying drawings, the cable 12 made according to the present invention includes an inner conductor 14, a first layer of insulation or dielectric material 16 of solid composition in the form of a sheath or sleeve, and another layer of insulation or dielectric material 18, also in the form of a sheath or sleeve surrounding the first layer 16 but of expanded, cellular or porous composition. Surrounding the layer 18 is an outer conductor 20. The inner conductor 14 may be a wire of silver plated copper, the layers 16 and 18 are preferably of thermoplastic material such as polyethylene, and the outer conductor or layer 20 may be of aluminum or copper. The layers 16, 18 and outer conductor may be applied by known extrusion methods, the layers of insulation being in tight fitting engagement with the elements thereunder.

The specific materials of the various components making up the cable do not in themselves enter into the invention, but the specific character or construction thereof, and the method of incorporating them in the cable, are of the essence of the invention. In co-axial cables, difficulties have arisen in maintaining accuracy as between the inner and outer conductors to provide minimum voltage standing wave ratio and extremely narrow impedance tolerance. This relationship is impaired or negatived by inaccuracies of non-uniformities between the interfacing surfaces of the inner and outer conductors. These irregularities or non-uniformities were often caused by inaccuracies in the insulation or dielectric material. The inner and outer conductors each in itself may be originally sized as to accurate dimensions, but in incorporating them in the cable with the insulation or dielectric material, inaccuracies or non-uniformities resulted.

The layer 16, being solid, is incompressible, i.e., if it should be attempted to reduce any projections extending beyond its standard diameter, the material forming the projections would spread laterally, resulting in variations in diameter in adjoining regions.

The cellular layer 18 has a large number of spaces, pores, or voids so that it can be compressed a substantial extent; the solid portions surrounding the spaces or voids, pursuant to compression of the layer, move or push into the spaces, in proportion to the force applied thereto, so that the outer surface of that layer can readily conform to the inner surface of the outer member producing the inward force, i.e., the outer conductor sleeve 20. The inner layer 16 is dimensioned to produce the greater portion of the final layer of insulation, while the expanded layer 18 is relatively thin, particularly in its final compressed form.

The outer tube 20 is of course originally oversized, and after all the components of the cable are assembled as in FIGURE 1, the assembly is drawn through a die 22 having an aperture 24, as represented in FIGURE 3. In this operation the outer tube 20 is reduced in dimensions, as is also the expanded dielectric sleeve 18, according to specific details referred to hereinbelow. The die 22 is of known kind and capable of reducing the outer tube 20 to accurate dimensions. This tube is in itself accurately dimensioned originally, both as to outside and inside diameters and when it is reduced, the outer dimension is accurate, but more particularly, because of the accuracy of the thickness of the wall of the tube, the inner diameter also is accurate, not being interfered with by any other obstruction, and particularly because of the fact that the layer 18 is cellular and porous and readily contractible or compressible by the tube.

For the purpose of exemplifying an embodiment of the invention, the inner conductor 14 may be on the order of .0785 inch in diameter; the inner solid dielectric layer 16 may be for example .235 inch in external diameter, while the outer expanded layer 18 originally is in the neighborhood of .275 inch in outer diameter. The tube 20 forming the outer conductor is originally on the order of .415 inch outer diameter and .355 inch inner diameter, and is reduced to in the neighborhood of .325 inch outer diameter and .265 inch inner diameter, this of course reducing the expanded layer 18. The operation also lengthens the outer tube, an original tube of for example 860 feet long is lengthened to about 1000 feet.

Because of the substantially complete and free yielding character of the expanded layer or sleeve 18, it is compressed or reduced uniformly throughout its body, providing substantially no resistance to the reducing movements of the outer tube, leaving no inaccuracies in the inner surface of the outer tube. This is in direct contrast to reducing the outer conductor tube on a solid sleeve of dielectric material, such as polyethylene, where any irregularities in the dielectric would result in corresponding irregularities in the inner surface of the outer conductor tube. In the present instance any such irregularities are absorbed by the expanded and cellular layer so that the accuracy of the inner conductor 14 and of the inner surface of the outer conductor 20 that originally were provided are maintained in assembling the elements together.

As will be noted by the dimensions set out above, the thickness of the layer 18 of the expanded material is relatively small compared with the inner layer 16, and is actually so dimensioned that when the outer conductor tube is reduced or contracted thereon, that layer is compacted to a condition approaching solid composition, although not fully so, in order to realize full contraction of the tube without hindrance by the expanded material first reaching a fully solid condition. The dimensions of the various elements making up the cable, as well as the proportions of the voids and solid portions of the expanded material are originally closely calculated so that in the final condition of the cable the spacing between the inner and outer conductors, and the total mass of material making up the two layers of insulation or dielectric material, provide the desired accurate characteristics of the co-axial cable. Ideally the voids in the expanded dielectric material should be at a minimum after compression thereof so as to approach the highest accuracy in dielectric constant, and assure the highest electrical performance of the cable which is particularly important at the higher frequencies.

It is important that the inner layer 16 of solid dielectric material form the greater part of the final total dielectric material and that the outer expanded layer form a relatively thin layer, and only sufficiently thick, considering the proportion of voids to solid material, to absorb the reduction in diameter of the outer tube.

While I have herein disclosed a preferred form of the invention, it will be understood that changes may be made therein within the spirit and scope of the appended claims.

I claim:

1. A co-axial cable including an inner conductor, an outer conductor, and circumferentially and longitudinally continuous layers of dielectric material all of the same substance between the conductors and including a solid and substantially non-compressible layer, and a cellular compressible layer in engagement with one of the conductors.

2. The invention according to claim 1 wherein the solid layer is innermost of the dielectric material and in engagement with the inner conductor.

3. The invention according to claim 1 wherein the cellular layer is compacted to a thickness substantially less than that it is capable of assuming in the absence of a conductor.

4. The invention according to claim 3 wherein the cellular layer in compacted form is of small thickness relative to that of the solid layer.

5. A method of forming a co-axial cable comprising utilizing an inner conductor, placing a pair of layers of insulation material including an inner one of solid material and an outer one of cellular material in telescoping relation over the inner conductor, placing a tube of conductive material over the insulation material and reducing it to reduce its inner diameter and thereby compact the layer of cellular material.

6. The method according to claim 5 wherein the layer of cellular material is of such dimensions that when it is compacted it is of a thickness substantially less than the thickness of the solid insulation material.

7. The method according to claim 5 wherein the cellular material after compaction closely approaches, but is less than, the solidity of the solid insulation layer.

8. The method according to claim 5 wherein the insulation material includes an inner layer of solid material extruded onto the inner conductor in effectively integral contact engagement therewith, the outer layer of cellular material is extruded onto the inner layer of solid material in effectively integral contact engagement therewith, the outer conductor is formed by placing a tube of conductive material over the other elements, of an inner diameter at least as great as the outer diameter of the outer cellular insulating material, and the assembly thereof is drawn through a die which reduces the dimensions of the outer tube and particularly the inner diameter thereof, accurately to a dimension in which the outer cellular layer is contracted to a condition closely approaching a solid condition.

9. A method of forming a co-axial cable comprising the steps, utilizing an outer and an inner conductor and circumferentially and longitudinally continuous layers of dielectric material therebetween including a solid non-compressible layer and a porous layer in engagement with one of the conductors, and changing the diameter of said one conductor in direction toward the other conductor.

References Cited

UNITED STATES PATENTS

| | | | |
|---|---|---|---|
| 1,227,346 | 5/1917 | Trood et al. | 174—102 |
| 2,556,224 | 6/1951 | Scott | 174—28 |
| 3,309,458 | 3/1967 | Yoshimura et al. | 174—107 |

DARRELL L. CLAY, *Primary Examiner.*

L. E. ASKIN, *Examiner.*

H. HUBERFELD, A. T. GRIMLEY,
*Assistant Examiners.*